United States Patent
Garcia et al.

(10) Patent No.: US 10,501,082 B2
(45) Date of Patent: Dec. 10, 2019

(54) ELECTRONIC LOCKING DIFFERENTIAL

(71) Applicant: Ford Global Technologies, LLC, Dearborn, MI (US)

(72) Inventors: Gustavo Luis Garcia, Canton, MI (US); Jacob Martin Povirk, Franklin, MI (US); Jihong Guo, Ann Arbor, MI (US); Filip Tomik, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/804,180

(22) Filed: Nov. 6, 2017

(65) Prior Publication Data

US 2019/0135289 A1 May 9, 2019

(51) Int. Cl.
| | |
|---|---|
| *B60W 10/12* | (2012.01) |
| *B60W 30/18* | (2012.01) |
| *B60W 10/16* | (2012.01) |
| *B60W 10/18* | (2012.01) |
| *F16H 48/30* | (2012.01) |
| *B60W 30/02* | (2012.01) |

(52) U.S. Cl.
CPC ...... *B60W 30/18109* (2013.01); *B60W 10/16* (2013.01); *B60W 10/18* (2013.01); *B60W 30/02* (2013.01); *B60W 30/18172* (2013.01); *B60W 2710/125* (2013.01)

(58) Field of Classification Search
CPC ...... B60W 30/12; B60W 30/20; B60W 30/02; B60W 30/18109; F16H 48/30
USPC .......................................................... 701/88
See application file for complete search history.

(56) References Cited

U.S. PATENT DOCUMENTS

| | | | | |
|---|---|---|---|---|
| 4,671,373 | A | * | 6/1987 | Sigl ........................ B60K 23/04 180/197 |
| 5,695,022 | A | | 12/1997 | Zalewski et al. |
| 5,853,342 | A | | 12/1998 | Pritchard et al. |
| 6,038,506 | A | * | 3/2000 | Diekhans ............... B60K 23/04 180/247 |
| 6,167,354 | A | | 12/2000 | Maleki et al. |
| 6,755,763 | B1 | | 6/2004 | Goto et al. |
| 7,969,326 | B2 | | 6/2011 | Sakakibara |
| 8,265,842 | B2 | * | 9/2012 | Povirk ................... B60K 23/04 475/157 |
| 9,333,965 | B2 | * | 5/2016 | Marsh ..................... F16H 48/30 |
| 9,605,740 | B2 | | 3/2017 | Porvirk et al. |
| 2005/0279562 | A1 | | 12/2005 | Hara et al. |
| 2006/0122032 | A1 | * | 6/2006 | Heier ..................... B60K 23/08 477/166 |
| 2006/0175113 | A1 | | 8/2006 | Rodeghiero |
| 2007/0184929 | A1 | * | 8/2007 | Piyabongkarn ........ B60K 17/16 475/84 |
| 2007/0250236 | A1 | | 10/2007 | Newberry et al. |
| 2008/0090688 | A1 | * | 4/2008 | Torres ..................... B60K 17/20 475/35 |

(Continued)

*Primary Examiner* — Tan Q Nguyen
(74) *Attorney, Agent, or Firm* — David Kelley; Brooks Kushman, P.C.

(57) ABSTRACT

A vehicle includes an anti-lock braking system (ABS), a stability control system (SCS), and an electronic locking differential. A controller of the vehicle is programmed to unlock the differential in response to activation of the ABS or the SCS. The controller is further programmed to, responsive to the deactivation of the activated one of the ABS and the SCS, inhibit locking of the differential for a predefined period of time.

20 Claims, 4 Drawing Sheets

(56) References Cited

U.S. PATENT DOCUMENTS

| | | |
|---|---|---|
| 2011/0082634 A1 | 4/2011 | Povirk et al. |
| 2016/0101770 A1 | 4/2016 | Yamazaki et al. |
| 2016/0194002 A1* | 7/2016 | Kelly .................... B60W 50/14 701/22 |

* cited by examiner

ELECTRONIC LOCKING DIFFERENTIAL

TECHNICAL FIELD

The present disclosure relates to electronic locking differentials and more specifically to controls for controlling locking and unlocking of the differential during certain operating conditions to prevent hardware damage to the differential.

BACKGROUND

Motor vehicles may include a differential on the drive axle to transmit torque produced by an engine to driven wheels of the vehicle. The differential allows the driven wheels to rotate at different speeds relative to each other. This allows the outer wheel to rotate faster than the inner wheel when the vehicle is turning.

A typical open differential includes a ring gear meshing with a pinion gear that is fixed to a driveshaft. A differential case is fixed to the ring gear and is supported for rotation within a housing of the differential. The case supports a pair of side gears and a pair of spider gears in meshing engagement with the side gears. The side gears are driveably connected to the driven wheels. The spider gears transmit torque from the case to the side gears to propel the vehicle. Open differentials have difficulty propelling the vehicle when one of the driven wheels is on a low-traction surface as torque from the engine is routed to the low-traction wheel resulting is wheel spin.

Limited-slip differentials were developed to overcome the drawbacks of open differentials. Typical limited-slip differentials include a clutch pack and a spring that cooperate to engage a side gear, associated with the higher-traction wheel, with the case to provide engine torque to both driven wheels.

A locking differential includes a locking mechanism configured to rotationally lock the side gears relative to each other so that the left and right driven wheels rotate in unison. Unlike limited-slip differentials, which rely on wheel spin to compress the clutch pack, locking differentials include a locker that mechanically locks the half shafts for unison rotation. The locker may be manually or electronically engaged. This type of differential is commonly employed on pickup trucks and sport utility vehicles to improve off-road capabilities.

SUMMARY

According to one embodiment, A vehicle includes an anti-lock braking system (ABS), a stability control system. (SCS), and an electronic locking differential. A controller of the vehicle is programmed to unlock the differential in response to activation of the ABS or the SCS. The controller is further programmed to, responsive to the deactivation of the activated one of the ABS and the SCS, inhibit locking of the differential for a predefined period of time.

According to another embodiment, a vehicle includes an anti-lock braking system (ABS), a stability control system (SCS), and a locking differential having an electronically controlled locker configured to lock the differential. A vehicle controller is programmed to, energize the locker to lock the differential in response to (i) vehicle speed being less than the threshold, (ii) accelerator-pedal position being less than a threshold, and (iii) steering angle being less than a threshold, and de-energize the locker to unlock the differential in response to activation of at least one of the ABS and the SCS. The controller is further programmed to, responsive to deactivation of the activated one of the ABS and the SCS, inhibiting energization of the locker for a predefined period of time.

According to yet another embodiment, a method of controlling an electronic locking differential includes locking the differential in response to engagement conditions being present. The method further includes unlocking the differential in response to activation of at least one of the anti-lock braking system (ABS) and a stability control system (SCS), and inhibiting locking of the differential for a predefined period of time that starts in response to the deactivation of the activated one of the ABS and the SCS.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
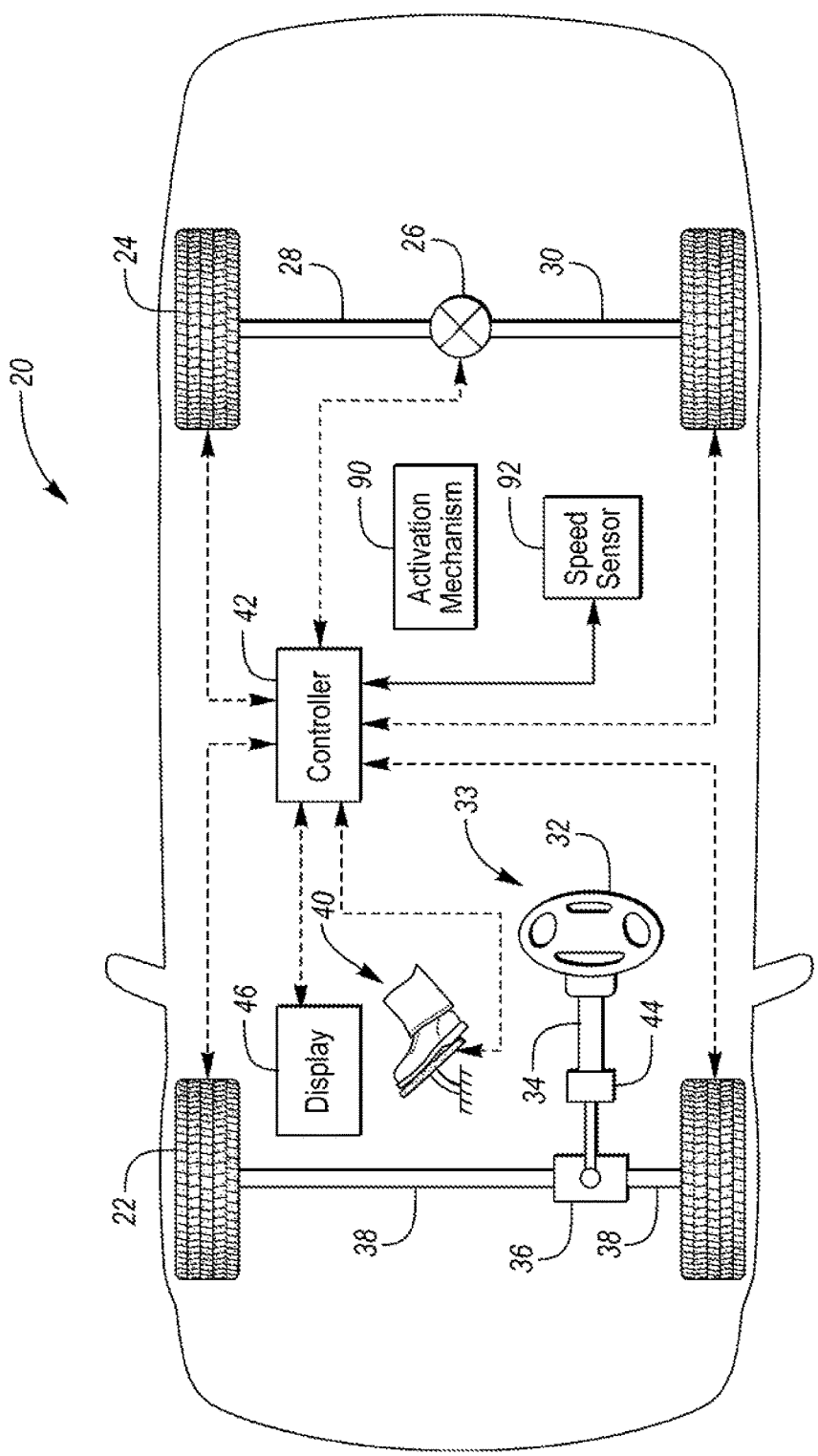
FIG. 1 is a schematic diagram of a vehicle including a controller and a differential according to one or more embodiments of this disclosure.

Referring to FIG. 1, a vehicle 20 includes front wheels 22 and rear wheels 24. In the illustrated embodiment, the vehicle is rear-wheel drive and the rear wheels 24 are powered by a powertrain including an engine, an electric motor, or combinations thereof. A driveshaft (not shown) may transmit power produced by the powertrain to the rear wheels 24 via a differential 26 and left and right half shafts 28, 30. An accelerator pedal 40 allows the driver of the vehicle 20 to control the power output of the powertrain. The vehicle 20 could also be front-wheel drive, all-wheel drive, or four-wheel-drive, in which case, the front wheels may include an associated differential.

The vehicle 20 also includes a steering system that turns the front wheels 22. The illustrated rack-and-pinion steering system 33 may include a steering wheel 32 that rotates a steering shaft 34. Rotation of the steering shaft 34 is transmitted to the front wheels 22 via a steering rack 36 and tie rods 38 to turn the wheels 22 in response to rotation of the steering wheel 32. Other types of steering systems are known and may be used in the vehicle 20.

The vehicle 20 includes a controller 42. While illustrated as one controller, the controller 42 may be part of a larger control system and may be controlled by various other controllers throughout the vehicle 20, such as a vehicle system controller (VSC). It is to be understood that the controller 42 and one or more other controllers can collectively be referred to as a "controller" that controls various actuators in response to signals from various sensors to control functions such as operating the powertrain, the front wheels 22, the rear wheels 24, the steering system 33, and the differential 26 for example. Any reference in the claims to "a controller" refers to one or more controllers. The controller 42 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 42 communicates with various sensors and actuators via an input/output (I/O) interface that may be implemented as a single integrated interlace that provides various raw data or signal conditioning, processing, and/or conversion, short-circuit protection, and the like. Alternatively, one or more dedicated hardware or firmware chips may be used to condition and process particular signals before being supplied to the CPU. In the illustrated embodiment, each of the wheels includes a wheel-speed sensor that is in communication with the controller 42. Each wheel-speed sensor outputs a signal indicative of rotational speed of that wheel. The wheel-speed sensors may be utilized in controlling an anti-lock braking system (ABS), a traction control system, and/or a stability control system. The steering system 33 is also in electronic communication with the controller 42 to provide a parameter to the controller 42 that is indicative of a steering angle. For example, the steering shaft 34 may include an associated sensor 44 that measures rotation of the steering shaft 34 and outputs a signal indicative of a steering angle. Alternatively, the steering angle can be inferred from other components such as the steering rack 36. The signals from the steering system may be used by the controller as a parameter indicative of steering angle. The accelerator pedal 40 may include a sensor that measures actuation of the pedal 40 and outputs a signal indicative of accelerator-pedal position to the controller 42. The controller 42 may use the pedal-position signal to operate the differential 26 as will be explained in more detail below. The vehicle 20 may include a display 46 such as a touchscreen radio head. The display 46 is configured to display information to occupants of the vehicle 20 and may include capacitive-touch elements allowing the driver to provide information to the controller 42. The vehicle 20 includes a speed sensor 92 configured to output a signal to the controller indicative of a speed of the vehicle.

The ABS may include hydraulic brakes (not shown) located at each wheel and a valve body (not shown) for independently controlling fluid pressure to the individual brakes. The valve body is in electric communication with the controller 42. The valve body may supply fluid pressure to the hydraulic brakes in response to the driver depressing the brake pedal, or the controller 42 may automatically apply the brakes without driver input. Each of the wheels may include speed sensors (not shown) that communicate individual wheel speeds to the controller 42. The wheel speed sensors are used to determine if activation of the ABS is needed.

The vehicle 20 may include a stability control system. The stability control system may include a plurality of sensors configured to measure vehicle acceleration, yaw, and other parameters. The controller 42 may be programmed to receive signals from the sensors and determine if stability control is needed. During stability control, the controller 42 may reduce powertrain torque to individual wheels and selectively apply individual friction brakes.

The differential 26 is an electronic locking differential that is in communication with the controller 42. The differential 26 includes an electronically actuated locker configured to lock the left and right half shafts 28 and 30 relative to each other when engaged and permit relative rotation between the half shafts 28 and 30 when disengaged. The locker is in communication with the controller 42 and locks the differential 26 in response to a command from the controller 42.

Figure 2:
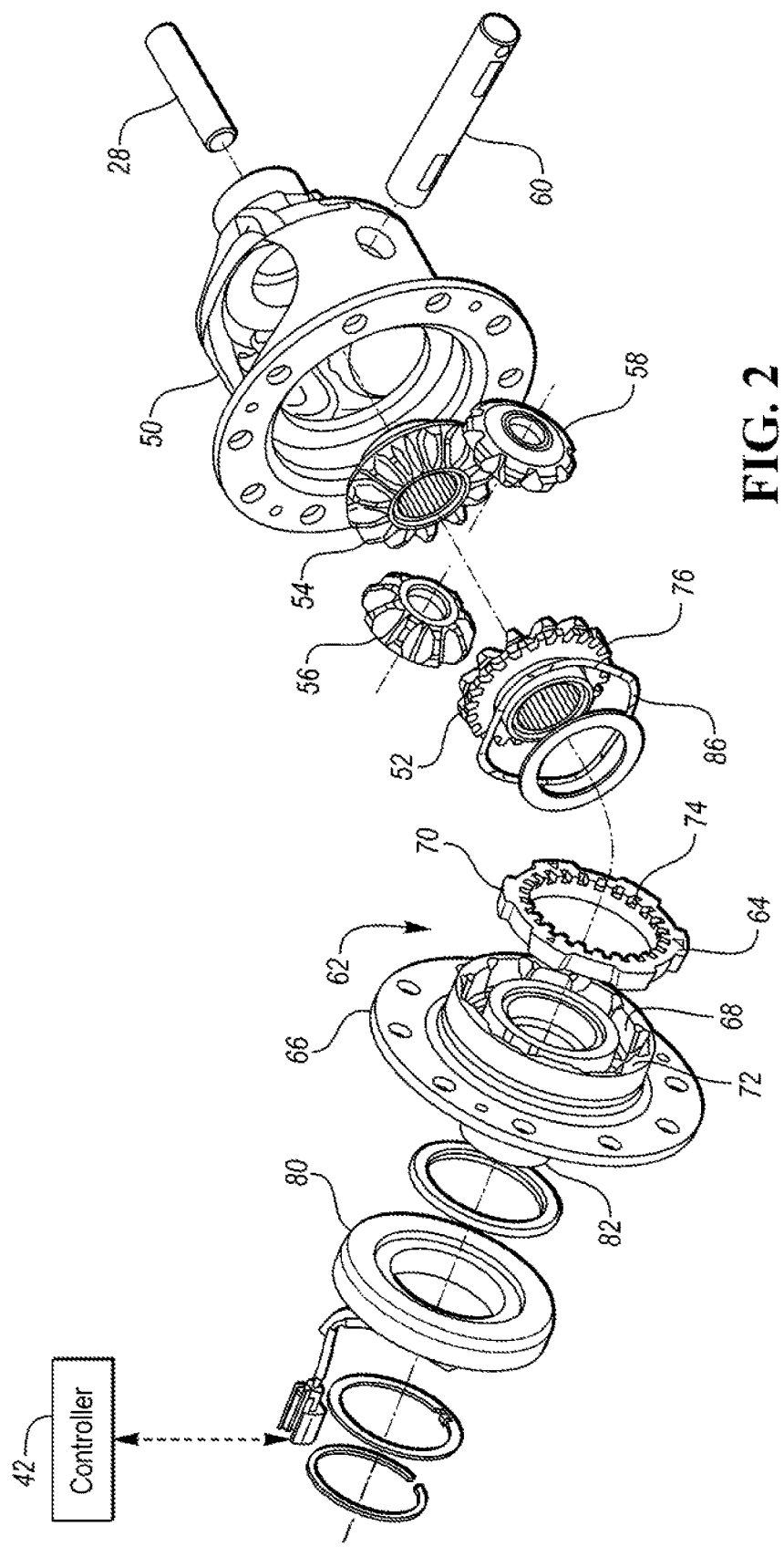
FIG. 2 is an exploded view of the differential of FIG. 1.
Figure 3:
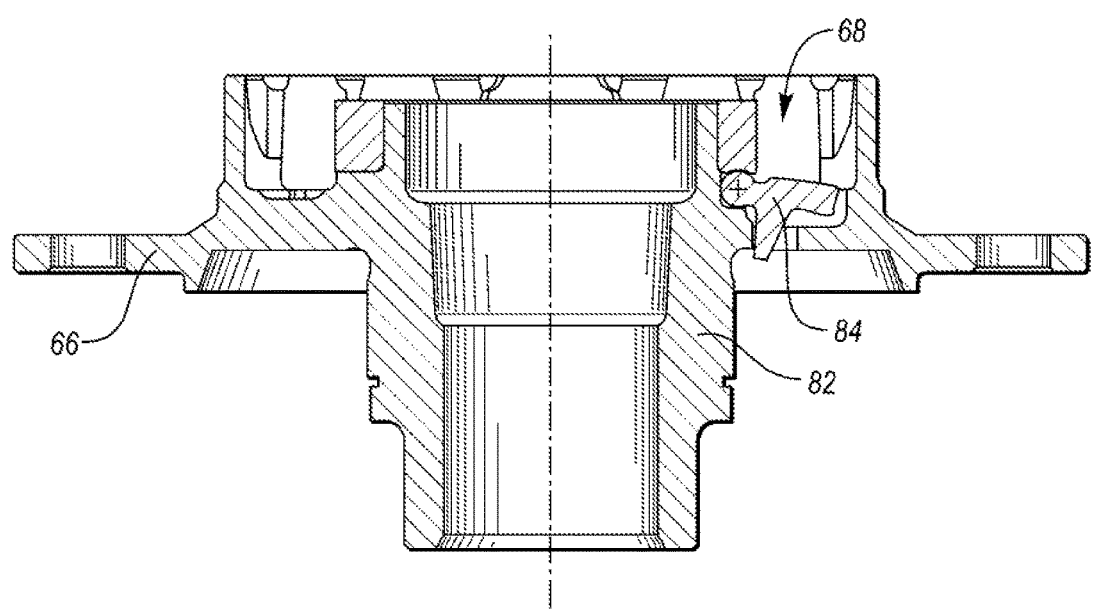
FIG. 3 is a cross-sectional view of the differential along cut line 3-3.

Many types of electronic locking differential are known and FIGS. 2 and 3 merely illustrate one example differential 26 that may be used in the vehicle 20. The differential 26 includes a housing (not shown) and a case 50 disposed within the housing. The case 50 is supported for rotation within the housing and is configured to receive power from the powertrain. The case 50 may support a pair of opposing first and second side gears 52, 54 and a pair of opposing first and second spider gears 56, 58 in meshing engagement with the side gears. A shaft 60 may interconnect the spider gears 56, 58. The first side gear 52 is configured to transmit torque to the left half shaft 30, and the second side gear 54 is configured to transmit torque to the right half shaft 28. The half shafts may be splined to the side gears.

The electronic locking differential 26 has an unlocked state (disengaged) in which the half shafts 28, 30 are permitted to rotate independent of each other, and a locked state (engaged) in which the half shafts are rotationally fixed to each other. The differential 26 may be placed in the locked state by fixing one of the side gears 52, 54 to the case 50 via an electronically actuated mechanism. This mechanism is commonly referred to as a locker.

The differential 26 includes an electronically controlled locker 62 configured to fix the side gear 52 to the case 50 when energized. In the illustrated embodiment, the locker 62 is a dog clutch. The locker 62 may include a locking ring 64 supported by an end cap 66. The end cap 66 is mounted to the case 50. The end cap 66 defines a receiving area 68 that receives the locking ring 64. The locking ring 64 defines arms 70 configured to engage with posts 72 of the end cap 66 to prevent rotation of the locking ring 64 relative to the case 50 while allowing axial movement of the locking ring 64 relative to the side gear 52. The locking ring 64 defines teeth 74 configured to engage with teeth 76 formed on a backside of the side gear 52. The differential 26 is locked by axially sliding the locking ring 64 into engagement with the side gear 52, which fixes the side gear 52 to the case 50. An electric coil 80 slides the locking ring 64 into the side gear 52. The electric coil 80 is disposed on a back hub 82 of the end cap 66 adjacent to the locking ring 64. When energized, the electric coil 80 is magnetically attracted to the case 50 and slides into engagement with levers 84 supported within the end cap 66. The coil 80 rotates the levers 84, which in turn, slide the locking ring 64 towards the side gear 52 until the teeth 74 and 76 mesh. The differential 26 is unlocked by de-energizing the electric coil 80. A wave spring 86 may be used to urge the locking ring 64 away from the side gear 52 when the coil 80 is de-energized.

In order for the locker 62 to lock, the teeth 76 of the side gear 52 and the teeth 74 of the locking ring 64 must intermesh. The locker 62 relies on the contact between the teeth 74, 76 to synchronize speeds of the side gear 52 and the locking ring 64 so that the teeth can fully engage. This occurs more easily when the rotational speed difference (differentiation) between the locking ring 64 and the side gear 52 is below a threshold and low or no torque is being transferred between the locking ring 64 and the side gear 52. Excessive torque or speed differentiation can cause ratcheting during engagement. Ratcheting creates wear on the teeth 74, 76, which reduces the life of the differential 26.

Vehicles equipped with electronic locking differentials typically include controls for monitoring vehicle speed and engine torque so that locking of the differential is not commanded when the vehicle speed or the torque of the powertrain exceeds a threshold. These typical checks, however, may be insufficient to prevent ratcheting in all operating conditions of the vehicle.

Referring back to FIG. 1, the vehicle 20 includes an activation mechanism 90 used by the driver in order to request locking of the differential 26. The activation mechanism is located in the passenger compartment such as on the dashboard. The activation mechanism 90 may be a button, a switch, a knob, a toggle, or capacitive touch element of the display 46. The activation mechanism 90 is in electronic communication with the controller 42 and is configured output a differential-lock signal. The controller 42 is programmed to receive the differential-lock signal and set a flag. The controller 42 is further programmed to attempt to lock the differential whenever the flag is present, but will only issue an engagement command to the locker 64 when prerequisite vehicle operating conditions are verified. For example, the controller 42 will command the differential 26 to lock in response to a flag being present, and the vehicle speed being less than a threshold, the pedal 40 being depressed less than a threshold, and the angle of the steering shaft 34 being less than a threshold. The controller 42 is also programmed to automatically unlock the differential 26, despite the flag being present, if the vehicle speed exceeds a threshold such as 25 miles per hour (mph). (The speed threshold may be higher or lower than 25 mph.) If the differential 26 is unlocked due to excessive vehicle speed, the controller is programmed to re-engage the locker 62 once the speed drops below the threshold if the flag is present and the other locking conditions are satisfied.

The differential 26 is especially prone to ratcheting during an automatic re-engagement of the locker 62 due to the vehicle speed cycling above and below the threshold. Speed cycling typically occurs at turns where a driver decelerates to negotiate the turn and subsequently accelerates on exit. While the vehicle is slowing for a turn, the vehicle speed and accelerator-pedal conditions are typically below their respective thresholds. Thus, the vehicle 20 relies on steering-angle monitoring to prevent activation of the locker 62 during a turn, which may cause ratcheting of the dog clutch.

The controller 42 may be programmed to de-energize the locker 62 in response to the ABS and/or the SCS being activated to allow independent rotation of the driven wheels 24. The controller 42 may be programmed to re-energize the locker 62 when the ABS and/or SCS event ends. The ABS and SCS events may be activated and deactivated within a very short time window. This time window may be shorter than the required disengagement time of the locker. This leads to the differential 26 attempting to re-engage a partially engaged locker 62. Re-engaging a partially engaged locker 62 may cause damage to the teeth of the locker 62 and/or the side gear 52. To avoid this, the controller 42 may be programmed with a time delay to reduce likelihood of an engagement command being issued before the differential is fully disengaged. The time delay may be a predetermined calibratable value preprogrammed into the controller 42. In one or more embodiments, the time delay may have a value between 0.5 to 2 seconds, inclusive.

Control logic or functions performed by controller 42 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 42. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 4:
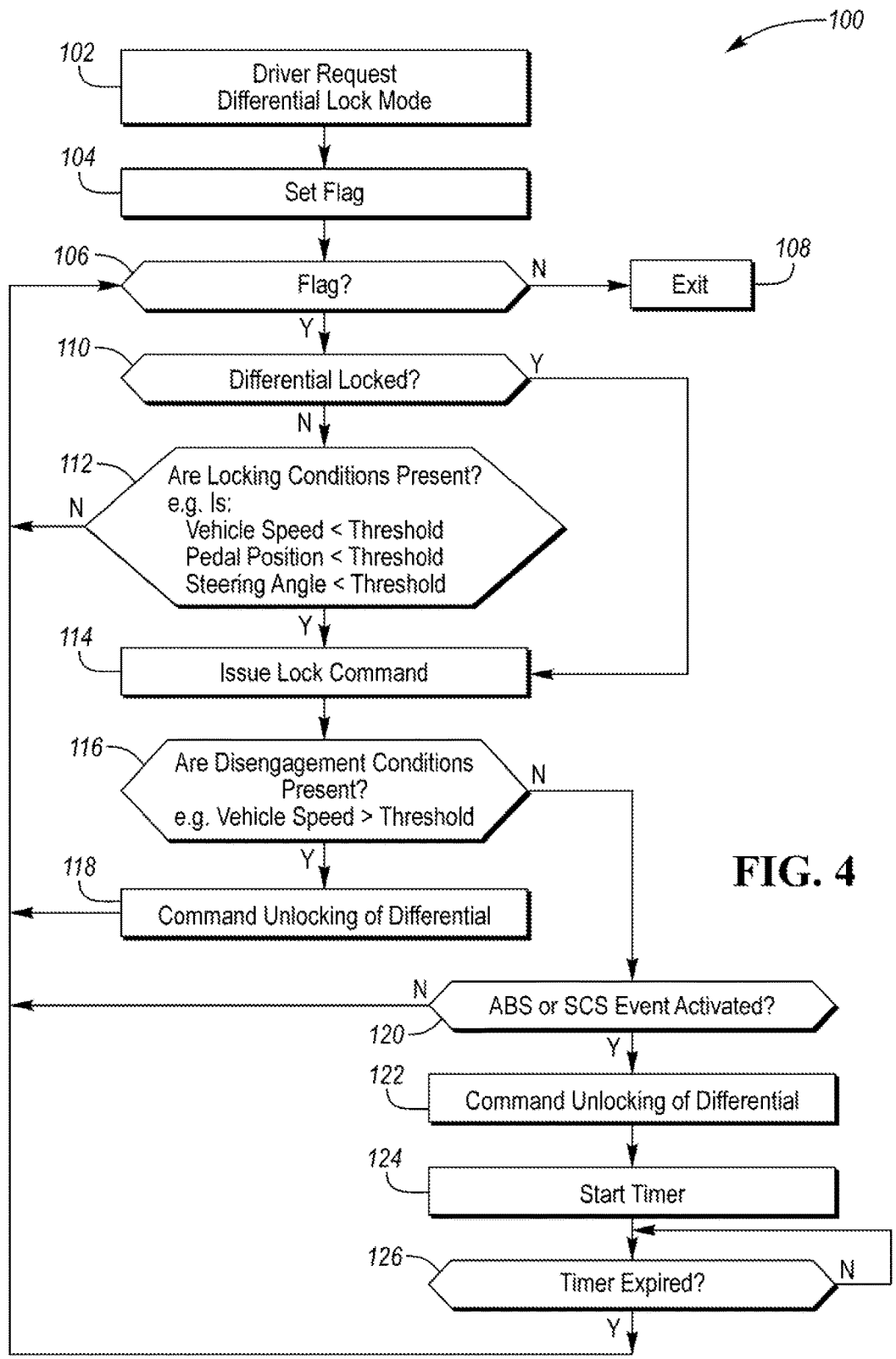
FIG. 4 is a flow chart illustrating an algorithm for controlling a differential.

FIG. 4 is a flowchart 100 of an algorithm for controlling operation of the locker 62. The algorithm begins at operation 102 when the driver requests locking of the differential i.e., the vehicle is placed in differential-lock mode. The driver may request differential-lock mode by actuating the activation mechanism. At operation 104, the controller sets a flag in response to receiving the request to lock the differential. At operation 106, the controller determines if a flag is present. If no, control passes to operation 108 and differential-lock mode is exited. (The flag may be active until the driver again actuates the activation mechanism.) If yes, control passes to operation 110 and the controller determines if the differential is currently locked. If the differential is not currently locked at operation 110, control passes to operation 112 and the controller determines if locking conditions are present. For example, the controller may determine that a vehicle speed is less than a threshold, accelerator pedal position is less than a threshold, and steering angle is less than a threshold. If all these conditions are satisfied, control passes to operation 114 and the controller issues a lock command to the differential. The lock command may include sending power to the coil in order to engage the locker.

Once locked, the differential is monitored for disengagement conditions. The algorithm 100 includes operation 116 for monitoring if disengagement conditions are present. The disengagement conditions may include vehicle speed exceeding a threshold. If disengagement conditions are present at operation 116, control passes operation 118 and the differential is commanded to unlock. The differential may be commanded to unlock by the de-energizing the coil allowing the return spring to disengage the locker. If disengagement conditions are not present at operation 116, then controls pass to operation 120.

At operation 120, the controller determines if the ABS or SCS is activated. If yes, control passes operation 122 and the controller commands unlocking of the differential. At operation 124, the controller starts a timer to prevent automatic re-locking of the differential for a desired period of time. Once the timer is started at operation 124, the controller periodically determines if the timer has expired at operation 126. Control passes to operation 106 once the timer has expired, and the controller determines if the flag is still active. The controller continuous executes the algorithm 100 at a frequency, such as every 500 milliseconds, and will continuously attempt to lock the differential as long as the flag is set, as shown at operation 106, and will command locking of the differential if the locking conditions are satisfied at operation 112.

If locking conditions are not satisfied at operation 112, the controller will not issue a lock command. And the controller will wait to lock the differential until the locking conditions of operation 112 are satisfied.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A vehicle comprising:
   an anti-lock braking system (ABS);
   a stability control system (SCS);
   an electronic locking differential; and
   a controller programmed to:
      unlock the differential in response to activation of the ABS or the SCS, and
      responsive to deactivation of the activated one of the ABS and the SCS, inhibit locking of the differential for a predefined period of time.

2. The vehicle of claim 1, wherein the controller is further programmed to, responsive to expiration of the predefined period of time, command locking of the differential.

3. The vehicle of claim 1, wherein the controller is further programmed to, responsive to a request to lock the differential and engagement conditions being met, command locking of the differential.

4. The vehicle of claim 1, wherein the controller is further programmed to command locking of the differential responsive to a request to lock the differential, engagement conditions being met, and expiration of the predefined period of time.

5. The vehicle of claim 4, wherein the engagement conditions include a steering angle being less than a threshold.

6. The vehicle of claim 1, wherein the period of time begins when the activated one of the ABS and the SCS is deactivated.

7. The vehicle of claim 1, wherein the period of time is 0.5 to 2 seconds, inclusive.

8. A vehicle comprising:
   an anti-lock braking system (ABS);
   a stability control system (SCS);
   a locking differential including an electronically controlled locker configured to lock the differential; and
   a controller programmed to,
      energize the locker to lock the differential in response to (i) vehicle speed being less than a threshold, (ii) accelerator-pedal position being less than a threshold, and (iii) a steering angle being less than a threshold,
      de-energize the locker to unlock the differential in response to activation of at least one of the ABS and the SCS, and
      responsive to deactivation of the activated one of the ABS and the SCS, inhibiting energization of the locker for a predefined period of time.

9. The vehicle of claim 8, wherein the controller is further programmed to, responsive to expiration of the time, re-energize the locker to lock the differential.

10. The vehicle of claim 8, wherein the controller is further programmed to re-energize the locker to lock the differential in response to (i) expiration of the time, a request to lock the differential, and (iii) engagement conditions being meet.

11. The vehicle of claim 10, wherein the engagement conditions include steering angle being less than a threshold.

12. The vehicle of claim 8, wherein the locker includes an electric coil.

13. The vehicle of claim 8, wherein the period of time begins when the activated one of the ABS and the SCS is deactivated.

14. The vehicle of claim 8, wherein the period of time is 0.5 to 2 seconds, inclusive.

15. The vehicle of claim 8 further comprising an activation mechanism configured to send a lock-differential signal to the controller, and wherein a driver requests locking of the differential via the activation mechanism.

16. A method of controlling an electronic locking differential, comprising:
   locking the differential in response to engagement conditions being present;
   unlocking the differential in response to activation of at least one of an anti-lock braking system (ABS) and a stability control system (SCS); and
   inhibiting locking of the differential for a predefined period of time that starts in response to deactivation of the activated one of the ABS and the SCS.

17. The method of claim 16 further comprising relocking the differential in response to expiration of the period of time.

18. The method of claim 16 further comprising relocking the differential in response to (i) expiration of the time and (ii) engagement conditions being meet.

19. The method of claim 18, wherein the engagement conditions include steering angle being less than a threshold.

20. The method of claim 16, wherein the period of time is 0.5 to 2 seconds, inclusive.

* * * * *